United States Patent Office 2,728,983
Patented Jan. 3, 1956

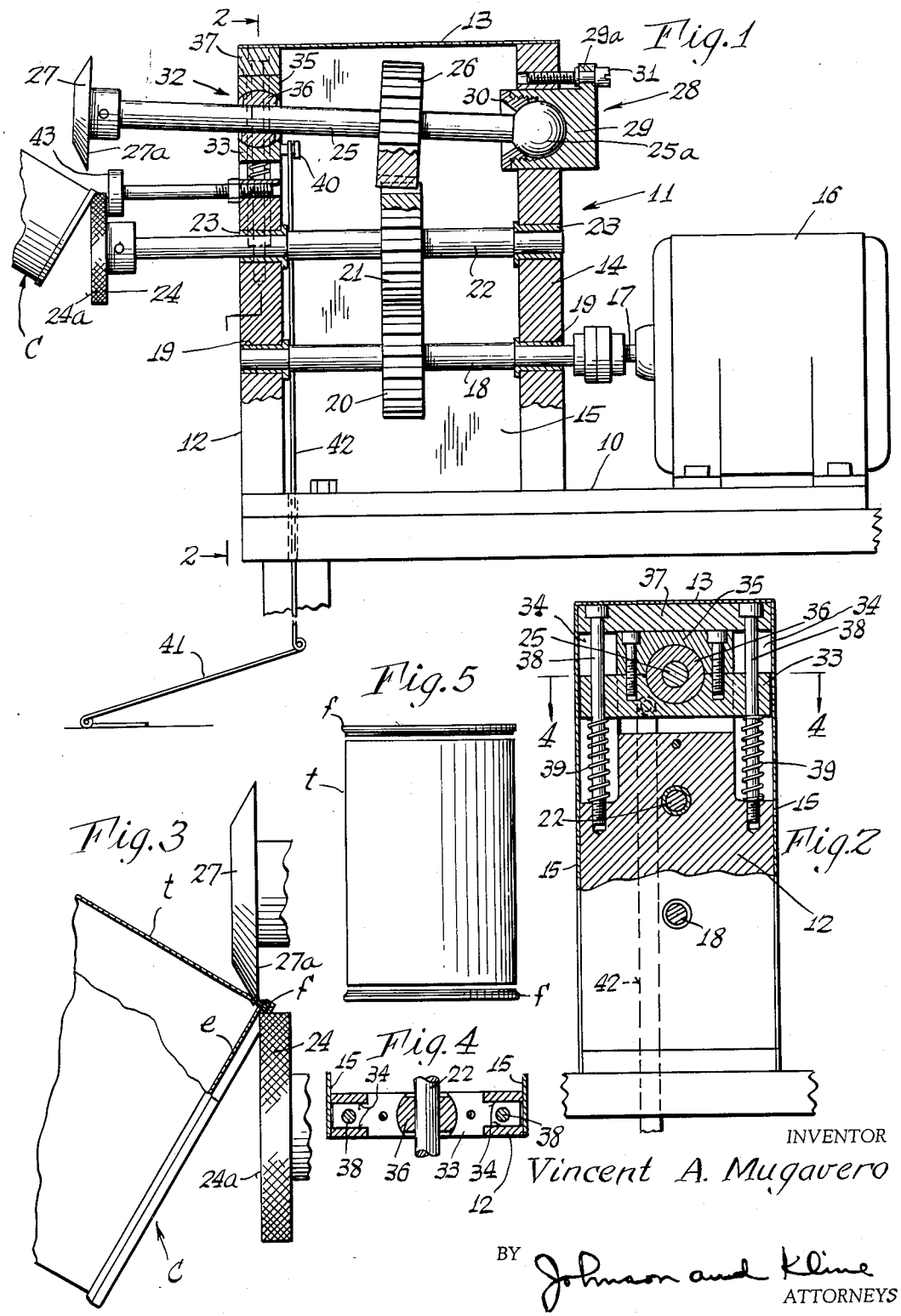

2,728,983
APPARATUS FOR REMOVING THE ENDS OF CONTAINERS

Vincent A. Mugavero, Ridgefield, Conn.

Application February 9, 1955, Serial No. 487,103

5 Claims. (Cl. 30—9)

This invention relates to a cutting device and more specifically to a cutting apparatus for shearing the end portions of a can from the tubular wall portion thereof.

Many types of commodities and industrial goods are packed, stored, or shipped in tubular containers having sealed ends. Efforts have been expended to facilitate the removal of such contents therefrom easily and quickly, particularly when the contents are in a solid or semi-solid state. Heretofore, such contents were removed from the containers by cutting a hole in the end and chopping or otherwise removing the contents through the hole. However, the disadvantage of this was that the end plate was not completely removed from the tubular walls of the container, and the remaining end portion projecting inwardly from the tubular wall interfered with the removal of the contents because, if the contents were semi-solid or viscous, the interfering end portion slowed down the flow thereof when poured and, if solid, the end portion prevented the contents from being bodily removed therefrom.

It is an object of this invention to provide means for facilitating the removal of the end portions of the tubular containers so that the contents are more readily and easily removed therefrom.

This is accomplished by a cutting device having a cutting tool and feeding tool mounted on a frame and relatively adjustable to secure therebetween an end portion of a container whereby the feeding tool may engage the inner surface of the circumferential transverse flange or seam at the end thereof causing the container to rotate as the cutting tool engages the tubular wall portion adjacent the seam to completely shear off the end plates of the containers so that the end openings are free of any disturbing flange projections which hinder the removal of the contents therefrom, thereby greatly facilitating the same.

A feature of this invention resides in the provision of a shearing apparatus having a novel arrangement whereby one of the tools is adjustably and movably mounted relative to the other to receive and shear the end portions completely from the tubular wall of containers of various sizes and/or construction.

Another feature of this invention resides in the provision whereby the complete removal of the end portions facilitates the salvaging of the major tubular portion of the container which can then be readily formed into reusable sheet material.

Other features and advantages will be apparent from the specification and claims when considered with the drawings in which:

Figure 1 is a side view of the cutting apparatus showing parts thereof in section.

Fig. 2 is a partial sectional view taken along line 2—2 of Fig. 1.

Fig. 3 is an enlarged detailed view showing the cutting tool in operative engagement with a can during a cutting operation.

Fig. 4 is a sectional view taken along line 4—4 of Fig. 2.

Fig. 5 is a fragmentational side view showing the ends of a container dismembered from the tubular wall portions thereof.

In accordance with this invention there is shown in the drawings an embodiment of a cutting or shearing device for shearing the ends of a container or can from the tubular wall portion thereof. As shown, the apparatus consists of a base having a surface 10 supporting a frame 11 having a front wall 12, a top wall 13 and a rear wall 14. If desired, side walls 15 may be provided to form an enclosure to house the moving parts of the device to be herein described.

Arranged on the surface 10 adjacent the rear wall 14 is mounted a motor 16 having a motor shaft 17 coupled to a driving shaft 18 which is journaled in suitable bearings 19, 19 on the front and rear walls respectively. Although the illustrated embodiment shows an electric motor as a driving means, it will be understood that a hand crank or any other suitable drive means may be connected to the drive shaft to provide power therefor. A gear 20 fixed to the drive shaft 18 intermediate the ends thereof engages a second gear 21 fixed intermediate the ends of a second shaft 22 which is rotatably supported in suitable bearings 23, 23 in the front and rear walls. This shaft 22 extends beyond the front wall and has fixed to the front end thereof a feed wheel or tool 24 which is rotatable therewith. As shown, the periphery of the wheel 24 is knurled or scored, or otherwise marked so as to give it a better holding or gripping surface as will hereinafter be explained.

A third shaft 25 supported by the front and rear walls has fixed intermediate the ends thereof a gear 26 which meshes with the gear 21. This shaft 25 also projects beyond the front wall and has fixed thereto a cutting tool 27 herein illustrated as a frustro-conical cutting blade. As shown, the face 27a of the cutting blade extends slightly beyond the face 24a of the feeding tool so that as the two are moved into cooperating relationship, as will be hereinafter explained, they form a pair of shearing members as best seen in Fig. 3.

As illustrated in Fig. 1, the shafts 18 and 22 are parallel and shaft 25 is movable to a substantially parallel position so that the gears 20, 21 and 26 form a gear train whereby the rotation of the drive shaft 18 is transmitted to shafts 22 and 25 causing the feed tool 24 and the cutting tool 27 to rotate in opposite directions. As shown in Fig. 1, the gears 21 and 26 have their teeth so arranged that they remain in meshed relation even though the shaft 25 may be disposed in its normal raised position. While any suitable gear ratio may be provided, the illustrated form provides that the shafts 22 and 25 be driven at equal speeds.

Generally containers do not conform to any specific size and are differently constructed, i. e. the ends of the containers may be rolled, overlapped or butted and welded, soldered, folded or otherwise joined to the tubular portion to form therewith a ridge, flange, or reinforced seam whereby the depth of the flange or seam formed thereby varies in accordance with the manner in which the end pieces are joined to the tubular wall.

According to this invention, means are provided whereby the cutting device herein illustrated accommodates the variously constructed and sized containers as are now generally used. While the shaft 22 supporting the feeding tool 24 can be made adjustable relative to cutting tool shaft 25 or the two shafts 22 and 25 may be rendered adjustable relative to each other, in the illustrated form the cutting tool 27 is adjustably mounted. This is accomplished by pivotally mounting the shaft 25 in a journal means 28, which is transversely adjustable so that the cutting tool 27 is determinately positioned relative to the feeding tool 24.

As shown in Fig. 1, the rear end of the shaft 25 has a spherical ball 25a positioned in a spherical shaped journal 29 supported in an opening of the rear wall. A cone bearing 30 threaded to the journal 29 secures the ball 25a of the shaft 25 in the journal 29 so that the shaft 25 may be pivoted thereabout.

To enable the shaft 25 to pivot, the front end thereof is supported in the front wall 12 by a ball-and-socket bearing means 32 which is slidably mounted therein so that the cutting tool may be moved from a normally retracted position into an operative position. This is accomplished by a slidable bearing mounted in guideways formed in the front wall, a portion of the front wall being cut away to provide sliding space for the bearing. As shown in Fig. 2, the ball-and-socket bearing consists of a lower member 33 having the end portions sliding in the guideway 34 and a shorter upper member 35 connected thereto, the upper and lower member being provided with a hemospherical opening to accommodate a ball-type bearing 36 having an aperture therein through which the end of the shaft extends. A crosspiece 37 across the top of the front wall and secured thereto by a pair of long bolts which extend through openings in the lower member 33 forms a limit stop for the slidable bearing. Spring means 39 disposed about the bolts 38 between the lower member 33 and the front wall normally urges the bearing to retracted or inoperative position.

In order that the cutting tool on shaft 25 may be transversely adjusted relative to the face of the feeding tool so that the cutting tool is determinately positioned relative to the feeding tool, the journal 29 is adjustably mounted for transverse movement. This is accomplished by an adjusting screw 31 which is threaded through an opening in a projection 29a on the journal 29 and a hole in the rear wall so that as the adjusting screw is rotated, the journal 29, the shaft 25 and cutting tool 27 mounted thereon are moved transversely in accordance with the rotation thereof a corresponding amount.

To facilitate movement of the cutting tool into cutting position, a projection 40 fixed to the bearing member 32 is connected to a suitable means 41, as for example a foot pedal, by a connecting rod 42 so that pressure applied to the foot pedal will actuate the rod 42 to move the ball-and-socket bearing means 32 downwardly carrying the shaft and the cutting tool into engagement with a can C positioned on the feeding tool so that the end of the container is wedged securely therebetween as shown in Fig. 3. According to this arrangement, the feeding tool engages the inner circumferential portion of the end or the flange f. See Figs. 1 and 3. Where the width of the feeding tool is greater than the depth of the flange f formed by the connection between the ends e of the can and the tubular wall portion t, the can is tilted at an angle as shown. For heavy cans any suitable supporting means (not shown) may be provided to support the container in proper position. However, if the bottom or flange f of the can so permits, the container can be supported on the periphery of the feeding tool so that the tubular wall member is positioned substantially perpendicular thereto. In either position, the cutting tool engages the tubular wall portion t. Thus as the driving means is actuated and the tools are engaging the can, the gear train will cause the feed tool to rotate the can in the opposite direction to which the cutting tool is acting so that the end of the can and/or seam is sheared from the tubular wall portion.

In this manner it will be noted that the end portion is completely free of any disturbing inwardly projecting flanges or rim so that nothing remains on the tubular walls to interfere with the removal of the contents. Also, it will be seen that after the contents have been removed the container is in condition to be readily salvaged in that the major cylindrical portion of the can may be easily flattened or cut along the longitudinal seam thereof in accordance with my Patent No. 2,696,254 to form reusable sheet material. Thus it will be seen that the can is readily dismembered so that the elements thereof are substantially free of injurious distortions, and the like, and which may be subsequently used for purposes other than remelting.

If desired a stop member 43 may be positioned adjacent the feed tool or wheel to facilitate and/or limit the positioning of the container relative to the feed tool.

Variations and modifications may be made within the scope of the claims and portions of the improvements may be used without others.

I claim:

1. In an apparatus of the character described for removing the ends from the tubular wall portions of a container, a cutting device comprising a frame, a pair of shafts supported on said frame in substantially spaced relationship, a cutting tool mounted on the end of one of the shafts and a feeding tool mounted on the other shaft, one of said shafts having one end positioned in an adjustable bearing whereby said shaft is mounted for transverse movement and pivotally mounted for movement from a retracted to an operative position so that the tool mounted on the end thereof is predeterminately positioned relative to the other tool in order to accommodate particular container sizes, a gear mounted intermediate the ends of each shaft to form an intermeshing gear train for rotating said shafts, said gears being adapted to mesh in both retracted or operative position, means for relatively moving said tools from retracted into cooperating cutting relationship whereby the end portion of a can is wedged and secured therebetween with the feeding tool engaging the circumferential portion of the container and the cutting tool engaging the cylindrical wall portion of a container adjacent the end, and means for actuating said gear train to operate said feed tool and cutting tool so that the end of the container is sheared off adjacent the end of the tubular wall portion.

2. In an apparatus of the character described for removing the ends from the tubular wall portions of a can, a cutting device comprising a frame including a front wall having a guideway formed therein and a rear wall, a ball-and-socket bearing slidably mounted for movement in said guideway, a spherical journal adjustably mounted for lateral movement in the rear wall, a transversely extending shaft supported by said journal and bearing so that the shaft is transversely adjustable and pivotally mounted for movement from a retracted to an operative position, a second shaft journaled on said walls, the ends of said shafts projecting beyond the front wall, a cutting tool mounted on the projecting end of one shaft and a feeding tool mounted on the projecting end of the other, said shafts being relatively movable, means for relatively moving said tools into cooperating cutting relationship whereby the end portion of a can is wedged and secured between said tools with the feeding tool engaging the inner circumferential portion of the can end and the cutting tool engaging the cylindrical wall portion of a can adjacent the end, and means for actuating said feed tool and cutting tool so that the seamed end of the can is sheared off adjacent the end of the tubular wall portion.

3. In an apparatus of the character described for removing the ends from the tubular wall portions of a can, a cutting device comprising a frame including a front wall having a guideway formed therein and a rear wall, a ball-and-socket bearing slidably mounted for movement in said guideway, a spherical journal adjustably mounted for lateral movement in the rear wall, means for adjusting said journal, a transversely extending shaft supported by said journal and bearing so that the end of the shaft is transversely adjustable and pivotally mounted for movement from a retracted to an operative position, a second shaft journaled on said walls, the ends of said shafts projecting beyond the front wall, a cutting tool mounted on the projecting end of one shaft and a feeding tool mounted on the projecting end of the other, said shafts being relatively movable, spring means disposed between said frame and said bearing for normally urging said bearing supporting one of said tools to retracted position, means to overcome the force of said spring means for relatively moving said tools into cooperating cutting relationship whereby the end portion of a can is wedged and secured between said tools with the feeding tool engaging the inner circumferential portion of the can end seam and the cutting tool engaging the cylindrical wall portion of a can adjacent the end, and means for actuating said feed tool and cutting tool so that the end of the can is sheared off adjacent the end of the tubular wall portion.

4. In an apparatus of the character described for removing the ends from the tubular wall portions of a container, a cutting device comprising a frame including a front wall having a guideway formed therein and a rear wall, a ball-and-socket bearing slidably mounted for movement in said guideway, a journal adjustably mounted for lateral movement in the rear wall, a transversely extending shaft supported by said journal and bearing so that the end of the shaft is transversely adjustable and pivotally mounted for movement from a retracted to an operative position, a second shaft journaled on said walls, the ends of said shafts projecting beyond the front wall, a cutting tool mounted on the projecting end of one shaft and a feeding tool mounted on the projecting end of the other, a stop means adjacent said feeding tool to facilitate the positioning of a can end during a shearing operation, said shafts being relatively movable, means for relatively moving said tools into cooperating cutting relationship whereby the end portion of a can is wedged and secured therebetween with the feeding tool engaging the circumferential portion of the can end and the cutting tool engaging the cylindrical wall portion of a can adjacent the end, and means for actuating said feed tool and cutting tool so that the end of the can is sheared off adjacent the end of the tubular wall portion.

5. In an apparatus of the character described for removing the ends from the tubular wall portion of a can, a cutting device comprising a frame including a front wall having a guideway formed therein and a rear wall, a ball-and-socket bearing slidably mounted for movement in said guideway, a spherical journal adjustably mounted for lateral movement in the rear wall, a transversely extending shaft supported by said journal and bearing so that the end of the shaft is transversely adjustable and pivotally mounted for movement from a retracted to an operative position, a second shaft journaled on said walls, the ends of said shafts projecting beyond the front wall, a cutting tool mounted on the projecting end of one shaft and a feeding tool mounted on the projecting end of the other, a stop means adjacent said feeding tool to facilitate the positioning of an end of a can during a shearing operation, said shafts being relatively movable, spring means disposed in said guideway normally urging said bearing carrying one of said tools to inoperative position, means to overcome the force of said spring means for relatively moving said tools into cooperating cutting relationship whereby the end portion of a can is wedged and secured between said tools with the feeding tool engaging the inner circumferential portion of the can end and the cutting tool engaging the cylindrical wall portion of a can adjacent the end, and means for actuating said feed tool and cutting tool so that the end of the can is sheared off adjacent the end of the tubular wall portion.

References Cited in the file of this patent

UNITED STATES PATENTS

| | | |
|---|---|---|
| 1,393,412 | Waller | Oct. 11, 1921 |
| 1,424,960 | Waller et al. | Aug. 8, 1922 |
| 2,555,931 | Raab | June 5, 1951 |